United States Patent [19]

Trübenbach et al.

US005695697A

[11] Patent Number: 5,695,697
[45] Date of Patent: Dec. 9, 1997

[54] PRODUCING SINTERED ARTICLES FROM THERMOPLASTIC COMPOSITIONS CONTAINING POLYOXYMETHYLENE BINDER

[75] Inventors: Peter Trübenbach, Ludwigshafen; Graham Edmund McKee, Weinheim; Hans Wohlfromm, Ludwigshafen, all of Germany

[73] Assignee: BASF Aktiengesellschaft, Ludwigshafen, Germany

[21] Appl. No.: 335,044

[22] Filed: Nov. 7, 1994

[30] Foreign Application Priority Data

Nov. 8, 1993 [DE] Germany ............. 43 38 122.7

[51] Int. Cl.$^6$ ............................................. C01B 31/00
[52] U.S. Cl. ................... 264/29.1; 264/29.6; 264/60
[58] Field of Search ............................. 264/29.1, 29.6, 264/29.7, 60, 63; 419/11

[56] References Cited

U.S. PATENT DOCUMENTS

| | | | |
|---|---|---|---|
| 4,004,934 | 1/1977 | Prochazka | 106/44 |
| 4,295,890 | 10/1981 | Stroke | 501/90 |
| 5,145,900 | 9/1992 | Sterzel et al. | 524/404 |
| 5,198,489 | 3/1993 | Sterzel et al. | 524/439 |

FOREIGN PATENT DOCUMENTS

| | | |
|---|---|---|
| 413231 | 7/1990 | European Pat. Off. . |
| 0595099 | 10/1993 | European Pat. Off. . |
| 4314694 | 5/1994 | Germany . |

*Primary Examiner*—Christopher A. Fiorilla
*Attorney, Agent, or Firm*—John H. Shurtleff

[57] ABSTRACT

The process for the producing improved shaped sintered articles by first shaping a) a mixture of a ceramic or metallic powder or mixtures thereof with a moldable thermoplastic composition containing b) a thermoplastic polyoxymethylene binder and c) a second moldable and essentially inert thermoplastic polymer having a melting point between 90° and 220° C., such as a polyether of bisphenol A and an aliphatic diol. The binder is then removed from the shaped article by exposure to a gaseous acid-containing atmosphere, preferably below its softening temperature, while the second inert thermoplastic polymer is retained as a source of elemental carbon in which the ceramic or metallic powder is finely dispersed. This retained polymer is then pyrolyzed under an inert gas at elevated temperatures of at least 600° C. for conversion to a finely dispersed elemental carbon. The resulting pyrolyzed preformed product is then sintered to obtain the desired high density ceramic and/or metallic article as the final product in which elemental carbon is uniformly and finely distributed. The process provides a simpler and more easily controlled method of incorporating elemental carbon into the ceramic/metallic shaped and sintered product while also carefully controlling the initial shaping step to prevent any formaldehyde induced crosslinking in the thermoplastic binder composition.

8 Claims, No Drawings

PRODUCING SINTERED ARTICLES FROM THERMOPLASTIC COMPOSITIONS CONTAINING POLYOXYMETHYLENE BINDER

BACKGROUND OF THE INVENTION

The present invention relates to an improved process for producing shaped sintered articles containing finely divided carbon by shaping a mixture of a ceramic or metallic powder and a polyoxymethylene binder additionally containing a polymeric carbon precursor.

DESCRIPTION OF THE PRIOR ART

In the shaping and sintering of ceramic powders, for example, SiC, WC, TiC, TaC, ZrC, $SiO_2$ or $TiO_2$, or metallic powders, for example, Fe or low-alloy steels, including any mixtures of these inorganic powders the use of finely divided carbon in the form of graphite or carbon black as a sintering additive or reactant is known.

Thus, U.S. Pat. No. 4,295,890 and U.S. Pat. No. 4,004,934 described the sintering of a silicon carbide ceramic containing elemental carbon and compounds containing boron or aluminum at from 1900° C. to 2300° C., with or without the application of pressure. The addition of about 2% by weight of carbon removes the $SiO_2$-surface layer of the silicon carbide powder particles during the sintering process and, by means of reaction with $SiO_2$ produces a fine SiC and promotes the solid-phase sintering process of SiC.

However, use of elemental carbon such as graphite, carbon black, or coke creates problems with the uniform agglomerate-free dispersion of the carbon. Particularly when using carbon black, its high specific surface area impairs the flowability of injection-molding compositions.

To obtain high-performance ceramic or metallic shaped articles, a homogeneous dispersion of the carbon is therefore required. For this purpose, U.S. Pat. No. 4,004,934 has already proposed the use of thermosetting resins which pyrolyze to give carbon under inert gas, such as novolak type resins such as a phenol aldehyde condensate which is dissolved in a suitable solvent, e.g. acetone or a higher alcohol, to uniformly coat the silicone carbide powder prior to pyrolysis, thereby achieving the required dispersion of elemental carbon in the polymer before it is shaped and sintered. Polymers of aromatic hydrocarbons such as polyphenylene or polymethylphenylene dissolved in an aromatic solvent are especially recommended. In both cases, however, the solvent must be removed by evaporation or drying before pyrolizing at high temperatures of 500° to 1800° C. to obtain free carbon particles dispersed in the powder. Additional steps such as jet milling must be used to improve the carbon distribution after this initial preparation of the carbon-containing powder. Conventional lubricants may be added or, to produce an extruded or injection molded product, it is necessary to select a binder such as polyethylene glycol which will decompose and evaporate without any appreciable residue, or a binder which may be removed by a porous contacting media as in slip molding. None of these techniques provide satisfactory results for extrusion or injection molding of ceramic and/or metallic powders containing a finely dispersed elemental carbon.

EP-A 413 231 describes a process for producing inorganic shaped sintered articles, in which green bodies are first shaped by means of extrusion or injection molding from sinterable powders and polyoxymethylene or a copolymer thereof containing a predominant proportion of oxymethylene units as binder. The copolymers are identified as polymers of trioxane with, for example, ethylene oxide, 1,3-dioxolane or butanediol formal which can be present in amounts of about 2-4% by weight. These are relatively simple copolymers which are compatible with the polyoxymethylene binder. The binder is removed from these green bodies, quickly and without cracking or distortion, by treatment with a gaseous acid or gaseous boron trifluoride.

It is an object of the invention to combine the advantages of EP-A 413,231 for rapid and relatively simple production of the shaped green bodies, using conventional extrusion and injection molding equipment, with the advantages of U.S. Pat. No. 4,004,934 which permits the incorporation of a finely dispersed elemental carbon into the shaped and sintered shaped or sintered molded product. At the same time, it is an object of the invention to overcome serious disadvantages in both of the known processes. Another object of the invention is to provide an initial ceramic and/or metal powder composition which contains both the binder and a thermoplastic polymer which can be converted within the green body into finely dispersed elemental carbon by pyrolysis in order to improve the final properties of the sintered articles.

In developing the present invention, it was discovered that, during shaping of the feedstock comprising ceramic or metallic powders and polyoxymethylene at around 170° C., small amounts of formaldehyde, below the MAC value, can be formed by thermal decomposition of polyoxymethylene. These amounts are sufficient to crosslink the known carbon-supplying compounds, such as phenolic resins, or similar epoxy resins or furan resins. The crosslinking of the carbon-supplying compounds increases the viscosity of the feedstock which in turn raises the temperature even higher, resulting in increased formaldehyde evolution and eventually the complete solidification of the feedstock in the apparatus.

Furthermore, many polyesters used with the inorganic powders are not homogeneously miscible with the feedstocks based on polyoxymethylene.

For this reason, there have hitherto been no known carbon-supplying compounds which can be processed with polyoxymethylene without problems at around 170° C.

It then became a primary object of the present invention to find carbon-supplying compounds which are readily compatible with the polyoxymethylene under processing conditions, which do not crosslink with formaldehyde, and which, after a pyrolysis step, give homogeneously dispersed carbon in the shaped green body and the final sintered article.

SUMMARY OF THE INVENTION

We have now found that this object is achieved by means of a process for producing shaped sintered articles by shaping a mixture of a) a ceramic and/or metallic powder and b) polyoxymethylene and/or a copolymer containing a predominant proportion of oxymethylene units to give a green body, removing the binder by treatment with a gaseous acid, pyrolysis and sintering, wherein there is added to the mixture of a) and b) a thermoplastic c) which is molten at from 90° to 220° C., is miscible with and stable to b) and does not undergo a crosslinking reaction with formaldehyde.

The invention also relates to compositions consisting essentially of from 35 to 75% by volume, based on the sum of a)+b)+c), of a ceramic and/or metallic powder a), from 25 to 65% by volume, based on the sum of a)+b)+c), of a mixture of a binder b) comprising polyoxymethylene and/or a copolymer containing a predominant proportion of oxymethylene units and a thermoplastic polymer c) which is molten at from 90° to 220° C., is miscible with and stable to the binder b) and does not undergo a crosslinking reaction with formaldehyde, with the proportion by weight of the thermoplastic polymer c), based on a), being from 0.1 to 15%.

If the compositions are used for producing ceramic bodies, the proportion of the component c) is preferably from 4 to 12% by weight and particularly preferably from 6 to 10% by weight, based on the component a). For metallic sintered bodies, the proportion of the component c) is preferably 0.4 to 8, in particular from 0.4 to 3.5, % by weight, based on a).

The thermoplastic polymers c) which supply carbon on pyrolysis and are to be used according to the invention are, different from the polymers b) and are in particular, polymers having a high carbon content and selected from the group consisting of polycarbonates and preferably polyethers, preferably containing a high proportion of aromatic rings, in particular polyethers which are derived from bisphenol A and an aliphatic diol component.

These polymers must melt about 90° C. and be stable up to 220° C. Their molecular weight should be in general from 5000 to 140,000 preferably from 10,000 to 20,000.

Polycarbonates are polyesters of carbonic acid with diols, preferably with aromatic diols, for example bisphenol A.

Particular preference is given to polyethers of the formula

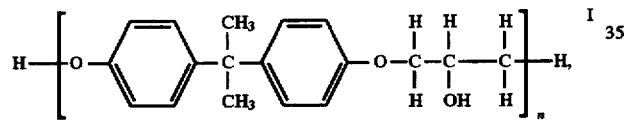

where n is from 20 to 500 and which can be obtained as described in H. F. Mark, N. G. Gaylord and N. B. Bikales, Encyclopedia of Polymer Science and Technology, Vol. 10, Phenoxy Resins: pp. 111–122, Interscience Publishers, New York, which is, in respect of individual properties, hereby incorporated by reference.

Further specific polymers which are useful are, for example, those of the formula

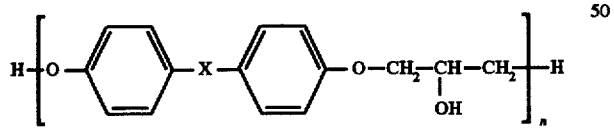

where n is from 20 to 500 and X is a radical of the formula

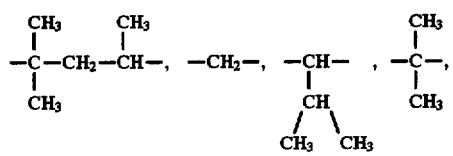

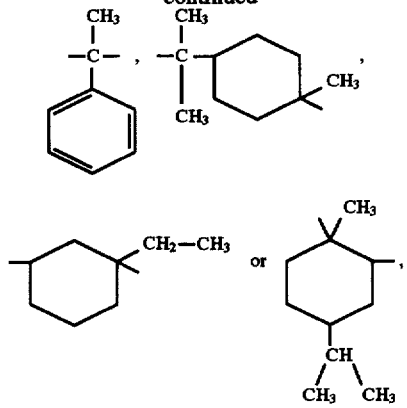

or those of the formula

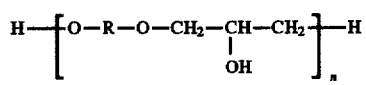

where n is from 20 to 500 and

R is a radical of the formula

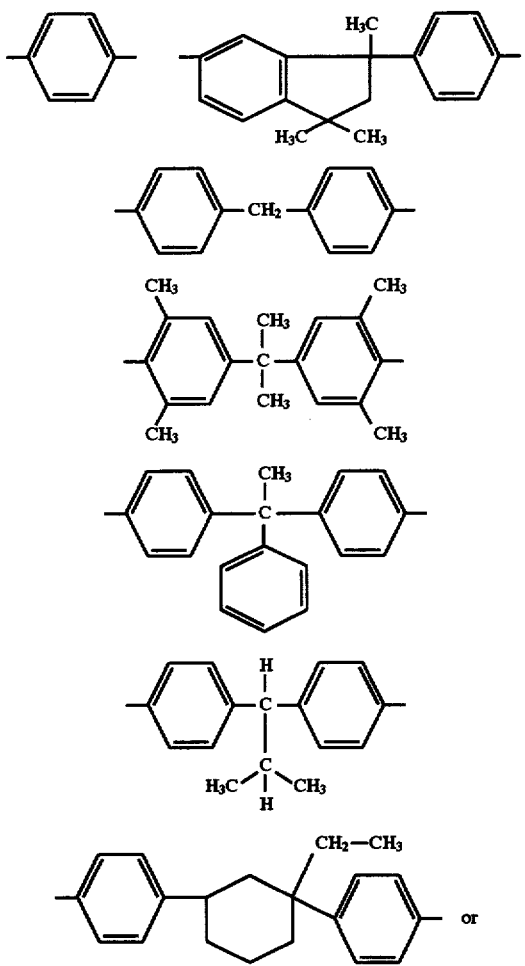

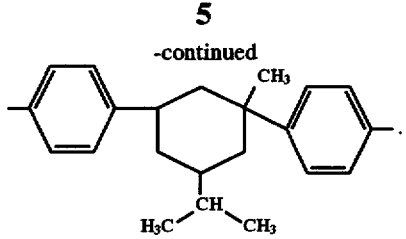

The carbon yield of the specified phenoxy resins is 10-35% by weight. The carbon-forming thermoplastics are incorporated in the ceramic and/or metallic powder is a particular ratio, with the amount used being from 0.1 to 15% by weight, based on the amount of the ceramic and/or metallic powder used.

The metal powders to be processed and the binder and also their processing are known per se and described in detail in EP 0 413 231 (U.S. Ser. No. 07/561522 pending), EP-A 595 099 (U.S. Ser. No. 08/136928 now abandoned) and DE-A 43 14 694, published May 11, 1994 and corresponding to WO-A-94/25,205, published Nov. 10, 1994, which are, in respect of details of the constituents and processing methods, hereby incorporated by reference.

Accordingly, suitable sinterable powders for the process of the invention are ceramic powders such as SiC, WC, TiC, TaC, ZrC, $SiO_2$ or $TiO_2$, furthermore metal powders such as Fe, Al, Cu, Nb, Ti, Mn, V, Ni, Cr, Co, Mo, W or Si, which have to have a particular carbon content to achieve the required material properties. The metal powders can be used either as such or in the form of alloys. Naturally, mixtures of these materials can also be used.

The particle size of the usable ceramic powders extends from nanocrystalline about 0.005 μm to 10 μm, preferably from 0.1 μm to 5 μm, particularly preferably from 0.2 μm to 2 μm.

The particle size of the usable metallic powders extends from 0.1 μm to 100 μm, preferably from 0.1 μm to 50 μm, particularly preferably from 1 μm to 30 μm.

The binders to be used according to the invention comprise, for example, polyoxymethylene which advantageously has a molecular weight of from 10,000 to 500,000. Besides homopolymers of formaldehyde or trioxane, suitable binders also include copolymers of trioxane with, for example, cyclic ethers such as ethylene oxide and 1,3-dioxolane or formals such as butanediol formal, with the amounts of the copolymers generally being from 1 to 4% by weight of the polymers.

Furthermore, inorganic fibers or whiskers of, for example, SiC can be added to the compositions. They can additionally contain auxiliaries such as dispersants or lubricants, such as polyethylene glycol, or further thermoplastic binders such as polyethylene, polymethyl methacrylate or polyethylene oxide. The amount of auxiliary is generally from 0.1 to 12% by weight of the total composition.

To produce the composition the inorganic powder, binder b), the carbon precursor c) and optionally auxiliaries are mixed at a temperature of 160° to 220° C., preferably 165° to 200° C. in a usual device like a kneader, a compounder or an extruder; the binder and the carbon precursor thus form a uniform molten phase.

The compositions are shaped, for example by injection molding at temperatures of from 160° C. to 200° C. and pressures of from 500 to 2000 bar. Small amounts of formaldehyde can here be formed.

The green bodies thus obtained are exposed to a gaseous, acid-containing atmosphere. The binder is here degraded to give gaseous products, preferably formaldehyde. The temperature during binder removal is generally from 100° C. to 160° C., with this process step being preferably carried out below the softening temperature of the binder.

The abovementioned phenoxy resin remaining in the articles after binder removal is pyrolzed under inert gas, such as nitrogen or a temperature of at least 600° C. to give finely dispersed carbon.

A particular advantage of the thermoplastic polymers c) for example is that, in the molten state, they are completely miscible at from 160°-220° C., preferably 165°-200° C. with the binder system, i.e., they form a uniform molten phase, which means that the carbon precursors are distributed homogeneously on the surface of the inorganic powder without having to carry out a coating step with solvent as described in U.S. Pat. No. 4,295,890 and U.S. Pat. No. 4,004,934. The process according to the invention manages without the conventional solvent coating of for example the novolak resins.

DESCRIPTION OF THE PREFERRED EMBODIMENTS

EXAMPLES

Example 1

20 mg of UCAR® Phenoxy Resin PKHH, a resin with the formula I, were heated in a thermobalance at 10K/min under argon to 900° C. After a holding time of 2 hours, a carbon residue of 24% remained.

Example 2

To produce a supereutectic carbon steel having a carbon content of 1.25% by weight, 1000 g of a carbonyl iron powder (carbonyl iron powder OM, BASF AG) having a carbon content of 0.8% by weight and an oxygen content of 0.3% by weight and an average particle size of 3–4 μm were compounded with 115 g of polyoxymethylene and 16.7% by weight of phenoxy resin (UCAR Phenoxy Resin PKHH, Union Carbide Deutschland GmbH; 24% by weight of carbon residue) and injection molded to give cylindrical disks having a diameter of 25 mm and a thickness of 5 mm.

The binder was catalytically removed from the test specimens by heating at 110° C. in a stream of nitrogen of 500 l/h into which 20 ml/h of concentrated $HNO_3$ were metered. The test specimens were subsequently sintered in an electrically heated furnace in an argon stream of 200 l/h, by bringing them to 1250° C. at a heating rate of 5K/min, holding this temperature for 1 hour and then cooling at 25K/min.

The density of the test specimens, determined by the Archimedes method in water, was 7.6 g/cm³ (corresponding to 97% of theoretical density). The total carbon content of the test specimens, determined by hot carrier-gas extraction, was at from 1.23 to 1.24% by weight, i.e. very close to the theoretically calculated value (1.25% by weight). Optical microscopic examination of polished sections of the test specimens showed a uniform perlitic microstructure having a finely disperse residual porosity, which demonstrates the suitability of the material for heat treatment.

Example 3

To produce a low-alloy heat-treatable steel of the type 100 Cr 6, material number 1.2067 (from 1.35 to 1.65% by weight of Cr, from 0.95 to 1.10% by weight of C), 1000 g of carbonyl iron powder (as in Example 2), 32 g of gas-atomized FeCr powder having a particle size of less than 25 μm (H. C. Starck), 122 g of polyoxymethylene and 13.5 g of phenoxy resin were processed as described in Example 2.

The binder was removed from the test specimens as described in Example 2 and the specimens were reaction sintered in a nitrogen atmosphere at 1150° C. with a holding time of 1 hour. The heating rate was 2K/min, the cooling rate was 25K/min.

The sintered density of the test specimens was 97% of the theoretical density. The total carbon content of the test specimen was at 1.02% by weight very close to the theoretically calculated value of 1.05% by weight. Examination of the microstructure showed a uniform perlitic microstructure containing secondary cementite. Energy-dispersive microanalysis in a scanning electron microscope showed a uniform Cr distribution.

Suitable heat treatment comprising annealing (750° C., 6 hours) and hardening (850° C., 30 min, quenching in water) was able to give a hardness of 750 HV 0.5, which proves the suitability of the sintered material for heat treatment.

Example 4

The amounts shown in the table of phenoxy resin UCAR® PHENOXY RESIN PKHH from Union Carbide Deutschland GmbH were compounded with 1000 g of SiC having an average particle size of 0.4 μm and 4 g of boron having a particle size of 0.8 μm and with a polyoxymethylene copolymer (POM/PBDF) of trioxane and 2% by weight of butanediol formal having an average molecular weight of 150,000 and also with 2% by weight of polyethylene glycol (PEG) having a molecular weight of 800 as lubricant, and processed by injection molding to give bars having dimensions of 5×6×65 mm$^3$.

TABLE

| No. | Phenoxy Resin [%] | Resin [g] | POM/PBDF [g] | PEG [g] | $C_p$ [%] | $C_s$ [%] | $D_s$ [g/cm$^3$] |
|---|---|---|---|---|---|---|---|
| 1 | 10 | 100 | 284 | 28 | 3.3 | 1.0 | 3.19 |
| 2 | 15 | 150 | 226 | 28 | 4.3 | 1.3 | 3.20 |
| 3 | 20 | 200 | 168 | 27 | 6.6 | 3.6 | 2.75 |

[%]: percent by weight, based on SiC used
$C_p$: free carbon content after pyrolysis
$C_s$: free carbon content after sintering
$D_s$: sintered density The binder was removed from the bars by heating for 4 hours at 135° C. and atmospheric pressure with 80 g of oxalic acid and 500 l/h of nitrogen as inert gas.

After heating at 5° C./min to 800° C. and a holding time of 2 hours under argon, analysis found the free carbon contents ($C_p$) shown in the table.

After sintering the pyrolyzed bars at 2100° C. under Ar, the free carbon contents ($C_s$) and sintered densities ($D_s$) shown in the table were obtained.

The free carbon contents of the pyrolyzed and sintered SiC test specimens were determined in accordance with DIN 51 075.

The SiC powder used had a free carbon content of 0.9% and an oxygen content of 2.0%. About 3% of free carbon after pyrolysis are required for successful sintering. The theoretical density of SiC is 3.22 g/cm$^3$.

We claim:

1. A process for producing a shaped sintered ceramic article containing finely divided carbon by the steps which include:

shaping a molten mixture of
 a) a ceramic powder, and
 b) a polyoxymethylene homopolymer or copolymer containing a predominant proportion of oxymethylene units as a binder, to first produce a green body, removing said binder from the shaped green body by treatment with a gaseous acid and subsequently sintering the green body, the improvement which comprises:

(1) adding to the mixture a) and b), a phenoxy resin c), containing bifunctional phenoxy groups and having a molecular weight of from 5,000 to 140,000 and a melting point of between 90° to 220° C. while remaining miscible with and stable to the binder b), which resin c) does not undergo a crosslinking reaction with formaldehyde released by said binder b) during the shaping step; and (2) prior to sintering the shaped green body but after removing the binder therefrom, subjecting said green body to pyrolysis at a temperature below the sintering temperature but sufficient to convert said phenoxy resin into a finely divided carbon.

2. A process as claimed in claim 1, wherein the thermoplastic additive c) is a phenoxy resin of the general formula

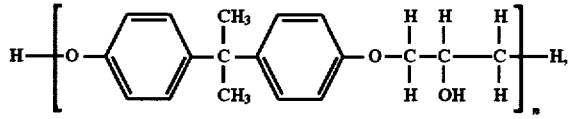

where n is from 20 to 500.

3. A process as claimed in claim 1, wherein SiC, WC, TiC, TaC, ZrC, SiO$_2$ and/or TiO$_2$ are used as the ceramic powder.

4. A process as claimed in claim 1, wherein α-SiC and/or β-SiC are used as the ceramic powder.

5. A process as claimed in claim 1, wherein the pyrolysis is carried out at from 600° to 1500° C. under inert gas.

6. A process as claimed in claim 1, wherein the pyrolysis is carried out at from 600° to 1200° C. under insert gas.

7. A process as claimed in claim 1 wherein the phenoxy resin c) is added to the mixture in a proportion of from 4 to 15% by weight with reference to the ceramic powder as component a).

8. A process as claimed in claim 1 wherein said phenoxy resin c) has a molecular weight of from 10,000 to 20,000.

* * * * *

UNITED STATES PATENT AND TRADEMARK OFFICE
CERTIFICATE OF CORRECTION

PATENT NO. : 5,695,697
DATED : December 9, 1997
INVENTOR(S) : Trübenbach et al.

It is certified that error appears in the above-indentified patent and that said Letters Patent is hereby corrected as shown below:

On the title page, item [54] and Column 1, lines 1-4, the title should read

--PROCESS FOR PRODUCING SHAPED SINTERED ARTICLES FROM MOLDABLE THERMOPLASTIC COMPOSITIONS CONTAINING A POLYOXYMETHYLENE BINDER--.

Column 6, line 5: after "nitrogen or" insert --argon, at--.

Signed and Sealed this

Eighteenth Day of August, 1998

Attest:

BRUCE LEHMAN

*Attesting Officer*            *Commissioner of Patents and Trademarks*